US011255537B2

(12) United States Patent
Crowe et al.

(10) Patent No.: US 11,255,537 B2
(45) Date of Patent: Feb. 22, 2022

(54) METALLIC BURNER TILES

(71) Applicant: NOVA Chemicals (International) S.A., Fribourg (CH)

(72) Inventors: Jeffrey Stephen Crowe, Calgary (CA); Eric Clavelle, Calgary (CA); Leslie Wilfred Benum, Red Deer (CA); Vasily Simanzhenkov, Calgary (CA); Lucas MacNeil Harding, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 427 days.

(21) Appl. No.: 16/314,901

(22) PCT Filed: Jun. 1, 2017

(86) PCT No.: PCT/IB2017/053236
§ 371 (c)(1),
(2) Date: Jan. 3, 2019

(87) PCT Pub. No.: WO2018/007882
PCT Pub. Date: Jan. 11, 2018

(65) Prior Publication Data
US 2019/0234612 A1    Aug. 1, 2019

Related U.S. Application Data

(60) Provisional application No. 62/359,748, filed on Jul. 8, 2016.

(51) Int. Cl.
*F23D 14/12*    (2006.01)
*F23D 14/22*    (2006.01)
(Continued)

(52) U.S. Cl.
CPC ........... *F23D 14/125* (2013.01); *F23D 14/22* (2013.01); *F23D 14/32* (2013.01); *F23D 14/48* (2013.01);
(Continued)

(58) Field of Classification Search
CPC ..................................... F23D 14/125
See application file for complete search history.

(56) References Cited

U.S. PATENT DOCUMENTS 3,630,176 A * 12/1971 Sato .......................... C10G 9/20
122/356
3,684,424 A * 8/1972 Zink ..................... F23D 14/125
431/114

(Continued)

FOREIGN PATENT DOCUMENTS

EP          1073140 B1    1/2002
GB          1 480 150     7/1977

OTHER PUBLICATIONS

Omori, A.; Development of Ultra Compact Lo NOx Burner for Heating Furnace; 1998 International Gas Research Conference; Supplied by the British Library Nov. 26, 2018; pp. 269-276.

*Primary Examiner* — Nathaniel Herzfeld
(74) *Attorney, Agent, or Firm* — Fish & Richardson P.C.

(57) ABSTRACT

The present disclosure seeks to provide a metallic burner tile for use in industrial processes such as cracking. The tile is substantially metallic (e.g. more than 80%) with the balance being ceramic coating on surfaces exposed to high temperature. The tile is lighter and more durable than the current ceramic burners.

15 Claims, 10 Drawing Sheets

(51) Int. Cl.
  *F23D 14/48*    (2006.01)
  *F23D 14/78*    (2006.01)
  *F23D 14/32*    (2006.01)
  *F23N 1/02*     (2006.01)
  *F23D 14/66*    (2006.01)

(52) U.S. Cl.
  CPC ............ *F23D 14/66* (2013.01); *F23D 14/78* (2013.01); *F23N 1/025* (2013.01); *F23D 2214/00* (2013.01); *F23N 2225/16* (2020.01)

(56) References Cited

U.S. PATENT DOCUMENTS

| | | | |
|---|---|---|---|
| 4,702,691 A | 10/1987 | Ogden | |
| 6,979,191 B1 | 12/2005 | Zink et al. | |
| 2002/0015932 A1* | 2/2002 | Poe | F23M 5/025 431/326 |
| 2004/0018461 A1* | 1/2004 | Stephens | F23M 11/042 431/115 |
| 2009/0075223 A1* | 3/2009 | Mosiewicz | F23D 14/70 431/351 |
| 2010/0021853 A1* | 1/2010 | Bussman | F23D 14/22 431/2 |
| 2013/0115564 A1* | 5/2013 | Marigowda | F23D 14/48 431/159 |
| 2014/0102440 A1* | 4/2014 | Martin | F23D 14/06 126/91 R |
| 2016/0169522 A1 | 6/2016 | Cunha et al. | |
| 2017/0336068 A1* | 11/2017 | Martin | F23D 14/04 |

\* cited by examiner

METALLIC BURNER TILES

FIELD

The present disclosure relates to the field of burners for industrial applications particularly applications at temperatures greater than 800° C. such as petrochemicals processing including cracking of paraffins. In some embodiments the present disclosure relates to metallic floor or wall burners used in such applications.

BACKGROUND

The cracking of paraffins such as ethane to olefins such as ethylene is energy intensive. The paraffin passes through tubes or coils in a furnace with flue gasses heated up to about 1200° C. The internal walls of the furnace are refractory material which radiates heat to the process coils. The walls are heated by a series of burners in the floor or walls or both. The temperature of the walls may reach temperature in the range from 700° C. to 1350° C., or from 800° C. to 1200° C.

Currently, parts of the burner in the interior of the furnace are manufactured with a refractory material. This makes the burners heavy. Additionally, the refractory or ceramic tends to be brittle and can break during transport and operation.

British patent 1,480,150 discloses an improvement relating to high temperature burners in which a metallic quarl having an inner and outer surface and providing a closed chamber surrounds the burner. A cooling medium passes through the quarl to keep the burner at a lower temperature. The patents teaches the cooling medium could be air being fed to the burner or exhaust gasses from combustion. The reference teaches away from the present disclosure as a double walled quarl is not used.

The paper Development of Ultra Compact Low NOx Burner for Heating Furnace in the Proceedings of the 1998 International Gas Research Conference by A. Omori of Osaka Gas Co., Ltd. pages 269-276 discloses a metal burner. The burner does not have channels in the interior metal burner walls to pass air over the wall and cool the burner. Further the burner is designed to provide a vortex flow of air to the flame to increase the surface area and reducing the flame temperature. Such a reduction in flame temperature may not be desirable.

United States Patent application 20100021853 published Jan. 28, 2010 in the name of Bussman assigned to John Zink Company LLC. Teaches a burner to produce low NOx emissions. In the figures the burners are tiles (e.g. ceramic or refractory) in which a significant amount of the burner is made of such materials. In contrast the burners disclosed herein comprise less than 20 wt % of ceramic or refractory, or for example, no ceramic or refractory. Additionally, if ceramic or refractory is used it is over coated on the outside of the metal.

The present disclosure seeks to provide a metallic, or substantially metallic burner for use in industrial applications such as cracker furnaces.

SUMMARY

The present disclosure provides a substantially metallic burner having a service temperature of not less than about 1200° C. for a cracking furnace operating with walls at temperatures from 700° C. to 1350° C. comprising:

i) a substantially metallic flow passage defined by at least one surface having a downstream outlet and at least one upstream inlet for at least a gaseous oxidant;

ii) said substantially metallic flow passage having at least one baffle directing the flow of oxidant and fuel against the internal surface of the burner facing the furnace; and ii) optionally one or more arrays of heat convective surfaces selected from baffles, ribs, fins and protuberances to direct the flow of said at least a gaseous oxidant over said one or more arrays on the internal surface of said substantially metallic flow passage.

In a further embodiment there is provided a burner having an arrays of heat convective surfaces that are ribs that define at least one continuous series of parallel channels at least on the internal surface of the portions of the burner exposed to the cracking furnace.

In a further embodiment there is provided a burner wherein the channels have a height to width ratio from 0.1 to 2, or from 0.25 to 2, in some embodiments from 0.5 to 2, in further embodiments from 0.5 to 1.

In a further embodiment there is provided a burner, wherein one or more metallic fuel line terminate(s) proximate the external front surface for said flow passage from 25 to 75% of the height of the front of the flow passage.

In a further embodiment there is provided a burner wherein said at least one metallic surface has a thickness from 4 to 25 mm In a further embodiment there is provided a burner comprising in cooperating arrangement:

i) a lower metal flow passage for one or more gaseous oxidants having an open back end, closed side walls and a closed bottom wall, a front wall and a top wall which does not extent the full length of the side walls to define an open upward facing vent in the upper front end of the flow passage; and a metal front wall continuous with the bottom wall of the flow passage;

ii) a metal upper section having the same width as the metal flow passage comprising a front wall, two parallel side walls and a rear wall defining a chamber, an open bottom which co-operates with the open vent in the flow passage and a front wall and an open top said front wall and back wall having openings therein at substantially the same height and lateral displacement to provide for one or more fuel supply lines passing from the back to the front of said upper section;

iii) either:
  a) one or more metal, or ceramic coated metal, top plates cooperating with the open top of the upper metal section, said one or more top plates having a planar surface optionally having a curved leading edge and one or more substantially circular passageways there through, said back section having one or more outlets which may be circular, oval, or polygon (e.g. triangular, rectangular or square) for said one or more gaseous oxidant there through; or
  b) a continuation of the upper front wall extending to the back wall of the upper section said continuation having a leading edge optionally curved and optionally having one or more substantially circular passageways there through, and a planar back section having one or more outlets which may be circular, oval, or polygon (e.g. triangular, rectangular or square) for said one or more gaseous oxidants there through, said back section optionally being coated with a ceramic; and iv) one or more descending baffle extending into said metal upper section.

As used herein planar refers to the degree of curvature of an element. But the current disclosure is not limited by the shape or geometry of the sides of the enclosure (e.g. box). While planar surfaces are exemplified, embodiments where the sides of the enclosure are curved or wavy are also envisioned.

In a further embodiment there is provided a burner wherein there is a descending baffle depending from a region not more than 10% forward of the forward lip of said one or more outlets for at least a gaseous oxidant, to the forward lip of said one or more outlets for said one or more gaseous oxidants, said baffle descending inside the upper metal section of the burner from 50 to 90% of the height of the front face of said burner; and extending laterally across the inner surface of the burner from 100 to 75% of the width of the face of said burner, said descending baffle being positioned so that there are substantially equal openings on each side of the descending baffle relative to the side walls of the metal upper section and where necessary said descending baffle having one or more circular channels there through to permit one or more fuel supply lines to pass there through.

In a further embodiment there is provided a burner having series of parallel longitudinal internal ribs to direct the flow of said at least a gaseous oxidant over the forward facing surface of said descending baffle.

In a further embodiment there is provided a burner further comprising an ascending baffle extending forward from the upper wall of said lower metal flow passage into from 45 to 85% of the open area in the chamber of a metal upper section.

In a further embodiment there is provided a burner wherein said ascending baffle extending forward from the upper wall of said lower metal flow passage is bent in its forward section up towards the open top to provide an upwards facing ascending baffle parallel to the inner front wall of upper section and where required the upward extending section of said ascending baffle having one or more circular channels there through to permit one or more fuel supply lines to pass there through.

In a further embodiment there is provided a burner wherein said ascending baffle extending forward from the upper wall of said lower metal flow passage further comprises on the surface facing the inner front wall of upper section a series of parallel longitudinal internal ribs to direct the flow of said at least a gaseous oxidant over the internal surface of said substantially metallic flow passage.

In a further embodiment there is provided a burner wherein the channels have a height to width ratio from 0.1 to 2. In some embodiments the ribs may have a height from 4 to 25 mm, or from 8 to 22 mm, in some instances from 10 to 20 mm.

In a further embodiment there is provided a burner wherein there is an ascending baffle extending forward from the upper wall of said lower metal flow passage into from 45 to 85% of the open area in the chamber of a metal upper section.

In a further embodiment there is provided a burner wherein said ascending baffle extending forward from the upper wall of said lower metal flow passage is bent in its forward section up towards said one or more outlets to provide an upwards facing ascending baffle parallel to the inner front wall of upper section and where required the upward extending section of said ascending baffle having one or more circular channels there through to permit one or more fuel supply lines to pass there through.

In a further embodiment there is provided a burner wherein said ascending baffle extending forward from the upper wall of said lower metal flow passage further comprises on the surface facing the inner front wall of upper section a series of parallel longitudinal internal ribs to direct the flow of said at least a gaseous oxidant over the internal surface of said substantially metallic flow passage.

In a further embodiment there is provided a burner wherein the channels have a height to width ratio from 0.1 to 2.

In a further embodiment there is provided a burner wherein said one or more top plates is present and is metal.

In a further embodiment there is provided a burner said one or more top plates is present and is metal coated with ceramic.

In a further embodiment there is provided a burner wherein the upper front wall continues to the upper back wall and the back section is not coated with ceramic.

In a further embodiment there is provided a burner wherein the upper front wall continues to the upper back wall and the back section is coated with ceramic.

DETAILED DESCRIPTION

Figure 1:
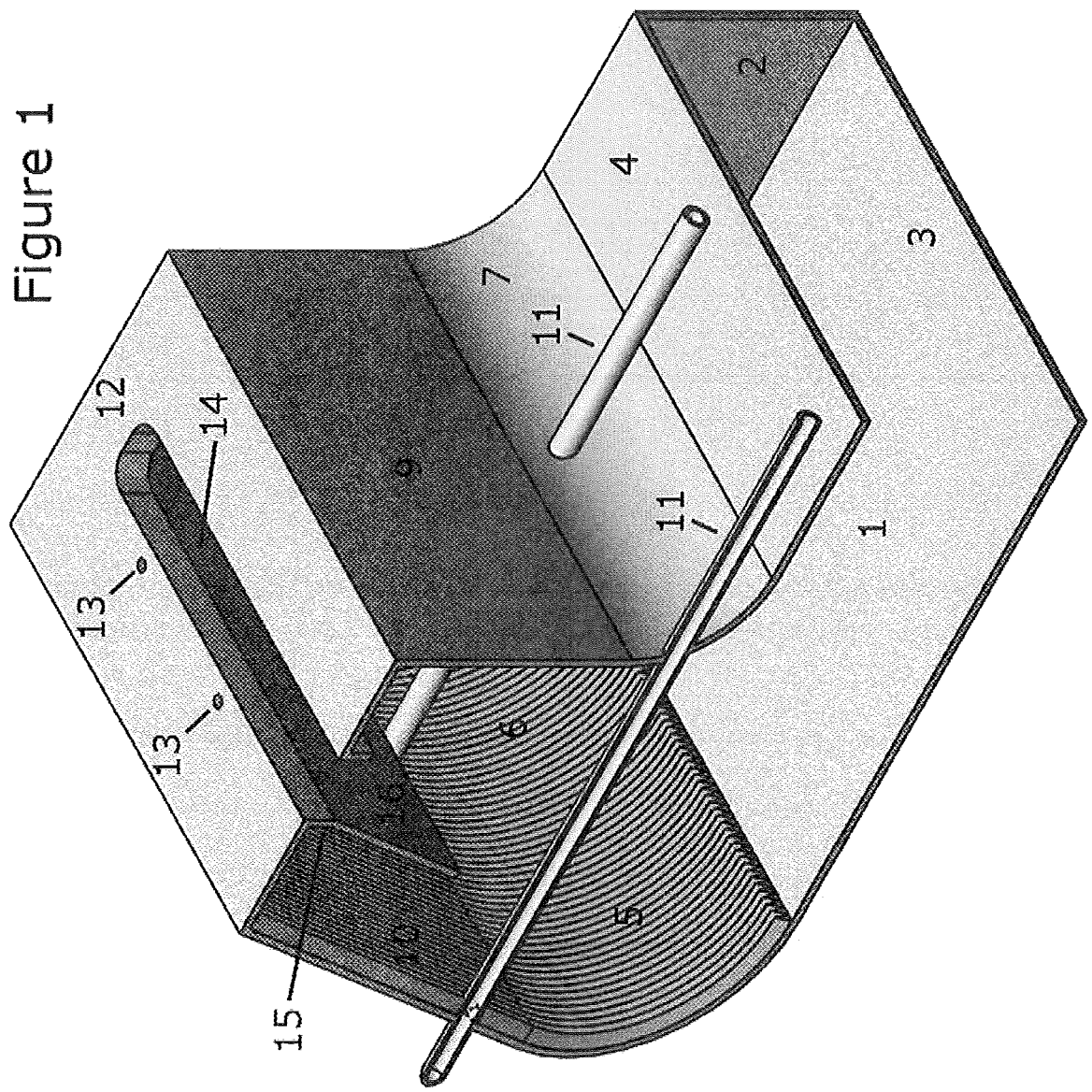
FIG. 1 is a cutaway isometric view of one embodiment of a burner according to the present disclosure having a descending baffle.

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that can vary depending upon the properties that the embodiments disclosed herein desire to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

As used in this specification substantially metal or substantially metallic and metallic all mean, relative to the total construction of the burner not less than 80% of the burner is metallic and the balance is an optional ceramic over coating on limited external surfaces of the burner as described below. In other words, the burner has no more than 20 wt. % of ceramic or refractory, or no more than 10 wt. % or no more than 5 wt. %, of ceramic or refractory.

In some embodiments, the substantially metallic burner disclosed herein is characterized by having a substantially metallic flow passage or path for one or more gaseous oxidants, for example air, but possibly oxygen enriched air, or a mixture of oxygen and an inert gas (other than nitrogen), defined by at least one wall (e.g. tubular) wherein the interior surface of the wall comprises a series of parallel longitudinal internal ribs or channels to direct the flow of at least a gaseous oxidant, for example air, over the internal surface of said substantially metallic flow passage. There is a balance between the convective cooling of the fuel and oxidant flowing through the burner relative to the heat release of the combusting fuel. The convective cooling flow rate is interdependent with the heat release rate, fuel composition and typical excess air, which results in a wet molar concentration of oxygen between 1% and 10%. The required heat release of the burner and the flow rate of oxidant and fuel will define the range of sizes of the burner. This range will be further defined by the range of velocities of oxidant and fuel velocities required for cooling. And the maximum practical pressure drop of the fuel and oxidant as it flows through the burner. The flow rate of fuel and oxidant can be calculated as needed by a person of ordinary skill in the art. The remaining parts of the burner are metallic, provided however, that portions of the burner adjacent, above (e.g. heat shield) or below the flame may have a complete or partial refractory coating. In some embodiments the longitudinal channels have a height to width ratio from 0.1 to 2 in some embodiments from 0.5 to 2, in some embodiments from 0.5 to 1. The ribs may have a height from 4 to 25 mm, or from 8 to 22 mm, in some instances from 10 to 20 mm. The ribs or channels may cover from about 15 to 100%, in some embodiments from 25 to 100%, in some embodiments from 60 to 100% of the internal surface area of the flow path. When the ribs or channels cover less than 100% of the internal surface area of the flow path the ribs or channels form a continuous series of parallel ribs or channels at least on the internal surface of the portions of the burner exposed to the cracking furnace.

The metallic walls may have a thickness from 4 to 25 mm, or from 8 to 22 mm, in some instances from 10 to 20 mm.

The channels may be replaced with longitudinal fins or protuberances.

The fins may have dimensions and spacing comparable to the longitudinal channels. They may have a height form about 4 to 25 mm, or from 8 to 22 mm, in some instances form 10 to 20 mm and a thickness from 2 to 20 mm, in some embodiments from 5 to 15 cm and be spaced apart 2 mm to 2 cm, in some instances from 5 mm to 1.5 cm.

The fins may have a number of cross sectional shapes, such as rectangular, square, triangular or trapezoidal. A trapezoidal shape may not be entirely intentional, but may arise from the manufacturing process, for example when it is too difficult or costly to manufacture (e.g. cast or machine) a triangular cross section.

In some embodiments the fin may be cast as part of the metal surface or be welded to the metal surface.

The protuberances are closed solids.

The protuberance may have geometrical shape, having a relatively large external surface that contains a relatively small volume, such as for example tetrahedrons, pyramids, cubes, cones, a section through a sphere (e.g. hemispherical or less), a section through an ellipsoid, a section through a deformed ellipsoid (e.g. a tear drop) etc. Some useful shapes for a protuberance include:
 a tetrahedron (pyramid with a triangular base and 3 faces that are equilateral triangles);
 a Johnson square pyramid (pyramid with a square base and sides which are equilateral triangles);
 a pyramid with 4 isosceles triangle sides;
 a pyramid with isosceles triangle sides (e.g. if it is a four faced pyramid the base may not be a square it could be a rectangle or a parallelogram);
 a section of a sphere (e.g. a hemi sphere or less);
 a section of an ellipsoid (e.g. a section through the shape or volume formed when an ellipse is rotated through its major or minor axis);
 a section of a tear drop (e.g. a section through the shape or volume formed when a non uniformly deformed ellipsoid is rotated along the axis of deformation); and
 a section of a parabola (e.g. section though the shape or volume formed when a parabola is rotated about its major axis—a deformed hemi- (or less) sphere), such as e.g. different types of delta-wings.

The spacing and height of the protuberances is comparable to that for fins. They may have a height form about 4 to 25 mm, or from 8 to 22 mm, in some instances form 10 to 20 mm and a thickness from 2 to 20 mm, in some embodiments from 5 to 15 cm and be spaced apart 2 mm to 2 cm, in some instances from 5 mm to 1.5 cm.

The protuberances may also be cast on to the internal surface of the metal. In some embodiments the protuberances form an array. In some embodiments the array is symmetrical, for example they may be in parallel rows (linear array) or with the protuberances in adjacent rows offset by the array spacing (diamond type array)

The density of the cooling channels, fins, protuberances or combinations thereof means the number of channels fins or array of protuberances per unit length transverse to the channels fins or array of protuberances (e.g. 5 channels per cm.) in those areas where the channels are present. This is distinct from the surface area coverage of the cooling channels. For example if only half of the internal surface of the metal component has cooling channels fins or protuberances, the channels fins or protuberances would have a different dimension than for channels covering the entire surface of the metal component. The fabrication costs for these different designs would differ so that in some embodiments the channel, fin, protuberance or protuberance array design or combinations thereof and surface coverage (either total or segregated by the type of heat conductive structure) is optimized to reduce manufacturing cost.

The channels, fins, protuberances or combinations thereof may cover from about 15 to 100%, in some embodiments from 25 to 100%, in some embodiments from 60 to 100% of the internal surface area of the flow path. When the ribs or channels cover less than 100% of the internal surface area of the flow path the ribs or channels form a continuous series of parallel ribs or channels at least on the internal surface of the portions of the burner exposed to the cracking furnace.

The burner additionally comprises a metallic fuel line which terminates proximate the external front surface of the burner at from 25 to 75%, or from 40 to 65% of the height of the front of the flow passage.

One embodiment of the present disclosure having only a descending baffle will now be described in conjunctions with FIGS. 1 and 2 in which like parts have like numbers.

Figure 2:
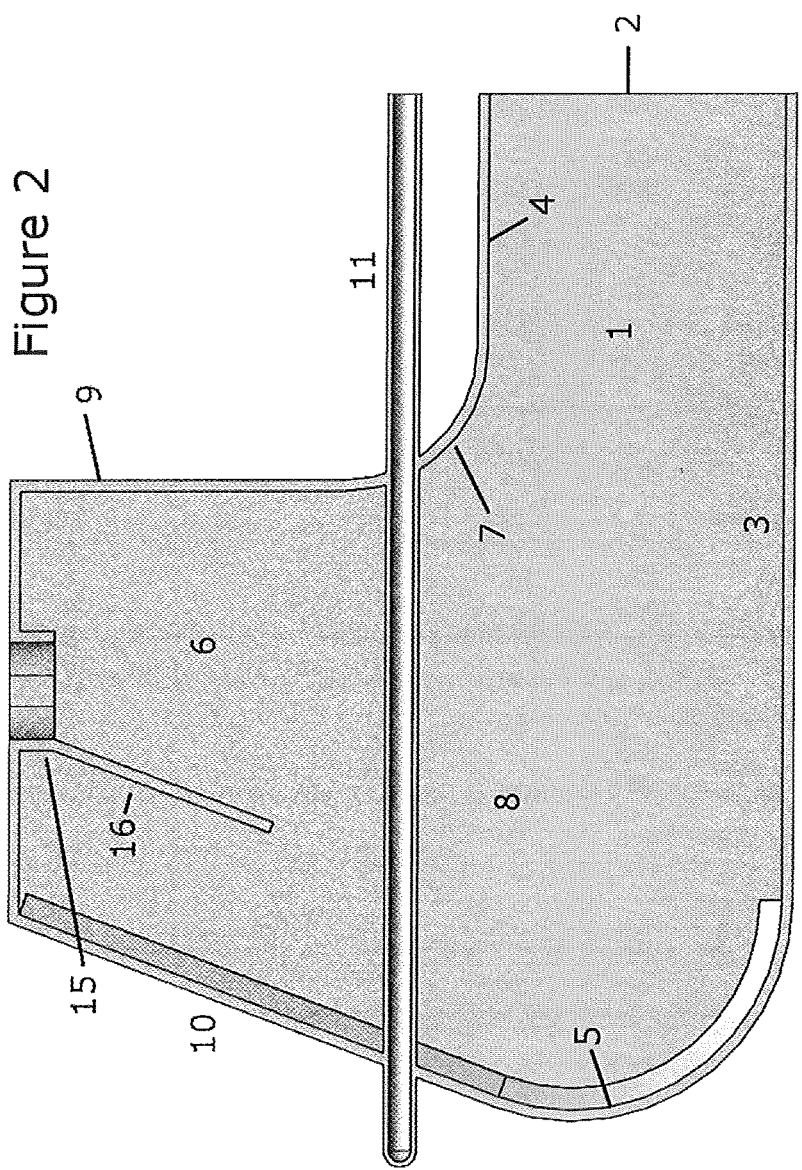
FIG. 2 is a cutaway side view through the burner of FIG. 1.

In FIGS. 1 and 2, the burner comprises a lower flow channel for one or more gaseous oxidants, 1 having an open back or upstream end. The flow channel is defined by a two equal length closed side walls 2 (only one is shown), a closed bottom wall 3 which extends beyond closed top wall 4 and a front wall 5. The top wall 4 does not extend as far as the side walls 2. As a result the lower flow channel defines an upward facing vent 6. In the embodiment shown there is a curved section 7 which cooperates with the top wall and defines the upward vent 6. However one skilled in the art would recognize the curved section 7 while desirable is not essential and the upper wall could extend further forward to still define the vent 6.

The burner also comprise an upper metal section or duct. The upper section comprises two side walls 8, a back wall 9 and a front wall 10 which cooperates with vent 6 to provide a continuous passage way. There are one or more holes in the curved section 7 or back wall 9, and the front wall 10 at substantially the same height (as used herein substantially the same height means a variation in height that is less than 10%, or for example less than 5%, or less than 2%) and lateral displacement from the side walls to permit the passage of one or more metallic fuel supply lines 11 through the burner.

At the top of the upper metal section are one or more top plates 12. There is a front top plate 12. While the figures show a flat top plate it may optionally have a rounded leading edge. There are one or more optional circular passages 13 through the leading edge of the top plate. While circular passages 13 are shown in the figure they are not essential to the operation of the burner. The top plates 12 cooperate to define one or more openings 14 at the top of the upper section or duct. The openings may be may be circular, oval, or polygon (e.g. triangular, rectangular or square). As used herein substantially circular means circular, oval, or polygon (e.g. triangular, rectangular or square).

In the embodiment shown in FIGS. 1 and 2 there is a hanger 15 which supports the top plates and also supports a descending baffle 16. The hanger is positioned so that the descending baffle 16 is not more than 10% forward of the trailing edge of the leading top plate 12. The baffle descents inside the upper metal section or duct of the burner from 10 to 50%, or from 15 to 30% of the height of the front wall 10 of said burner; and extends laterally across the inner surface of the burner from 100 to 75% of the width of the face of said burner, provided that if the baffle does not extend across 100% of the inner surface of the burner it is positioned so that there are substantially equal openings (as used herein substantially equal openings means a variation in height that is less than 10%, or for example less than 5%, or less than 2%) on each side of the baffle relative to the side walls of the metal upper section. If the baffle extends far enough into the top metal section of the burner there may be holes in the baffle to permit a fuel supply line to run through the baffle. If present the openings at the side of the baffle permit a swirling of the oxidant, for example air, flowing through the upper metal section of the burner. It is believed this swirling promotes good mixing of the fuel and the oxidant reducing NOx emissions.

Optionally, the walls of the front of the burner exposed to the interior of the furnace (e.g. front walls 5 and 10) have ribs or channels as described above. Additionally the front face of the baffle 16 may optionally also have ribs. Other internal surfaces of the burner could also have ribs or channels.

Figure 3:
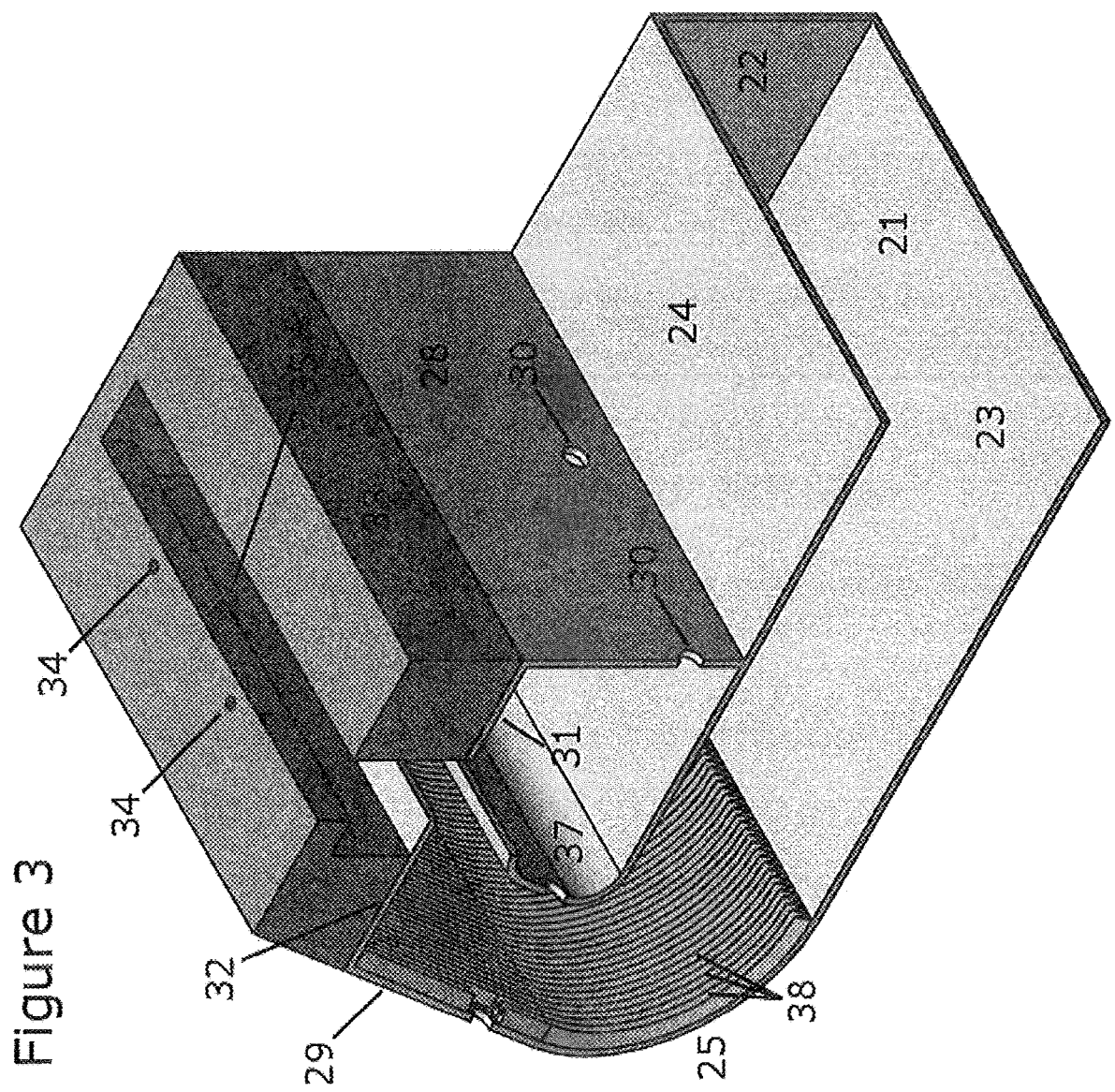
FIG. 3 is a cutaway isometric view one embodiment of a burner according to the present disclosure having an ascending baffle
Figure 4:
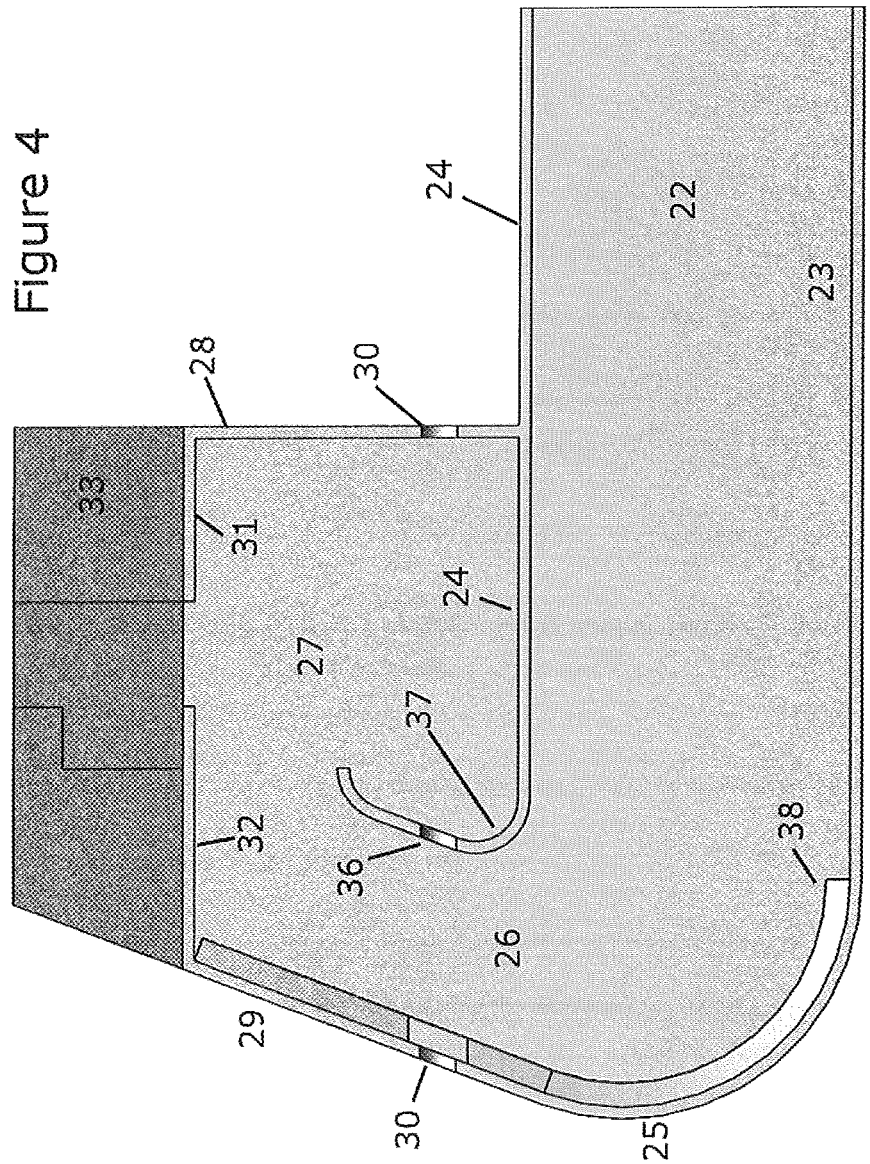
FIG. 4 is a cutaway side view through the burner of FIG. 3.

FIGS. 3 and 4 illustrate an embodiment having an ascending baffle. In FIGS. 3 and 4 like parts have like numbers.

In FIGS. 3 and 4, the burner comprises a lower flow channel 21 having an open back or upstream end. The flow channel is defined by a two equal length closed side walls 22 (only one is shown), a closed bottom wall 23 which extends beyond closed top wall 24 and a front wall 25. The top wall does not extend as far as the side walls. As a result the lower flow channel defines an upward facing vent 26.

The burner also comprise an upper metal section or duct. The upper section comprises two side walls 27 (only one is shown), a back wall 28 and a front wall 29 which cooperates with vent 26 to provide a continuous passage way. There are one or more holes 30 in the back wall 28 and the front wall 29 at substantially the same height and lateral displacement from the side walls to permit the passage of one or more metal fuel supply lines not shown through the burner.

At the top of the upper metal section are supporting flanges 31 and 32 which support one or more top plates 33. There is a front top plate 33 which is shown as flat but optionally it may have a rounded leading edge. Optionally, there are one or more circular passages 34 through the leading edge of the top plate. These holes 34 are optional and need not be present in the burner. The top plates 33 cooperate to define one or more openings 35 at the top of the upper section or duct. The openings may be may be circular, oval, or polygon (e.g. triangular, rectangular or square).

In the embodiment show in FIGS. 3 and 4 there is baffle 37 which extends from top wall 24 of the flow channel 21. The baffle 37 curves up into the upper metal section (duct) of the burner from about 15 to 75% of the height of the upper metal section. In this embodiment, the baffle 37 may completely traverses the upper metal or duct section. As shown in FIG. 4. If the baffle extends sufficiently high in the upper metal section of the burner there are one or more holes 36 in the baffle 37 to permit a metal fuel supply line to pass through the baffle 37.

The opening at the top of the baffle permits a swirling of the oxidant, for example air, flowing through the upper metal section of the burner. It is believed this swirling promotes good mixing of the fuel and the oxidant reducing NOx emissions.

In the embodiment shown in FIGS. 3 and 4 the walls of the front of the burner exposed to the interior of the furnace (e.g. front walls 25 and 29) have ribs or channels 38 as described above. Additionally the front face of the baffle 37 may also have ribs. Other internal surfaces of the burner could also have ribs or channels.

Figure 5:
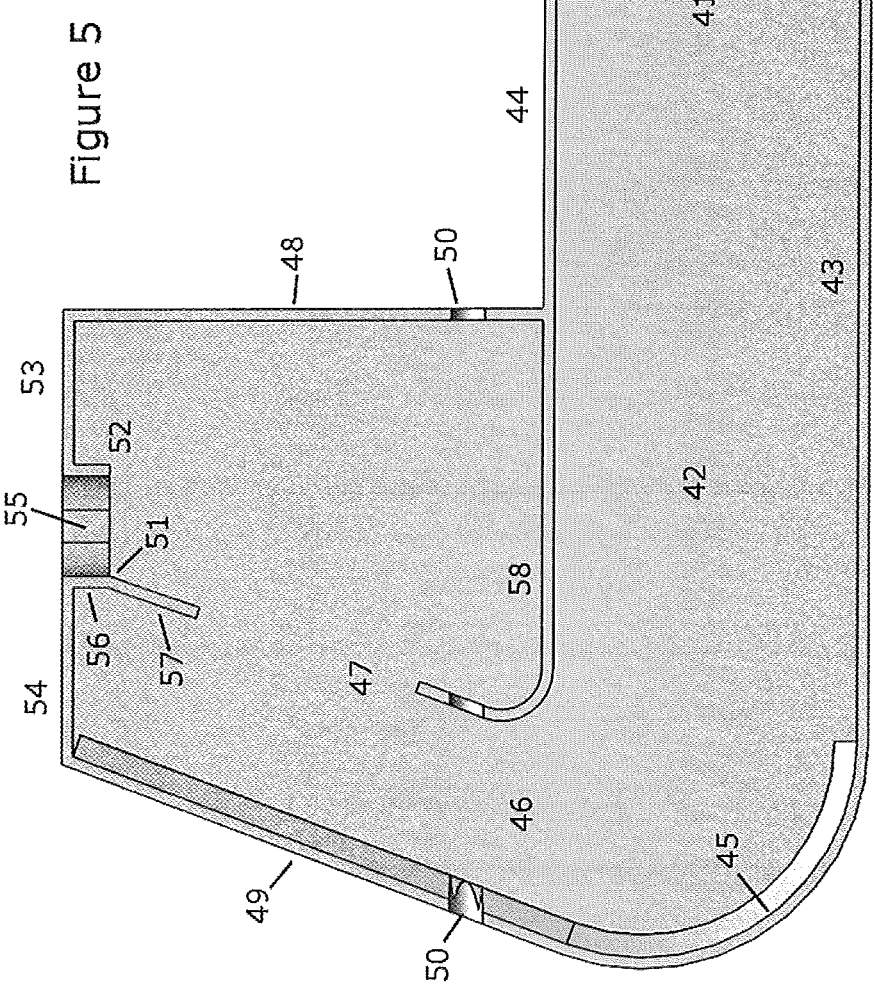
FIG. 5 is a cutaway side view of a burner having both a descending baffle from the top of the upper section and a baffle extending from the top wall of the lower flow passage.
Figure 6:
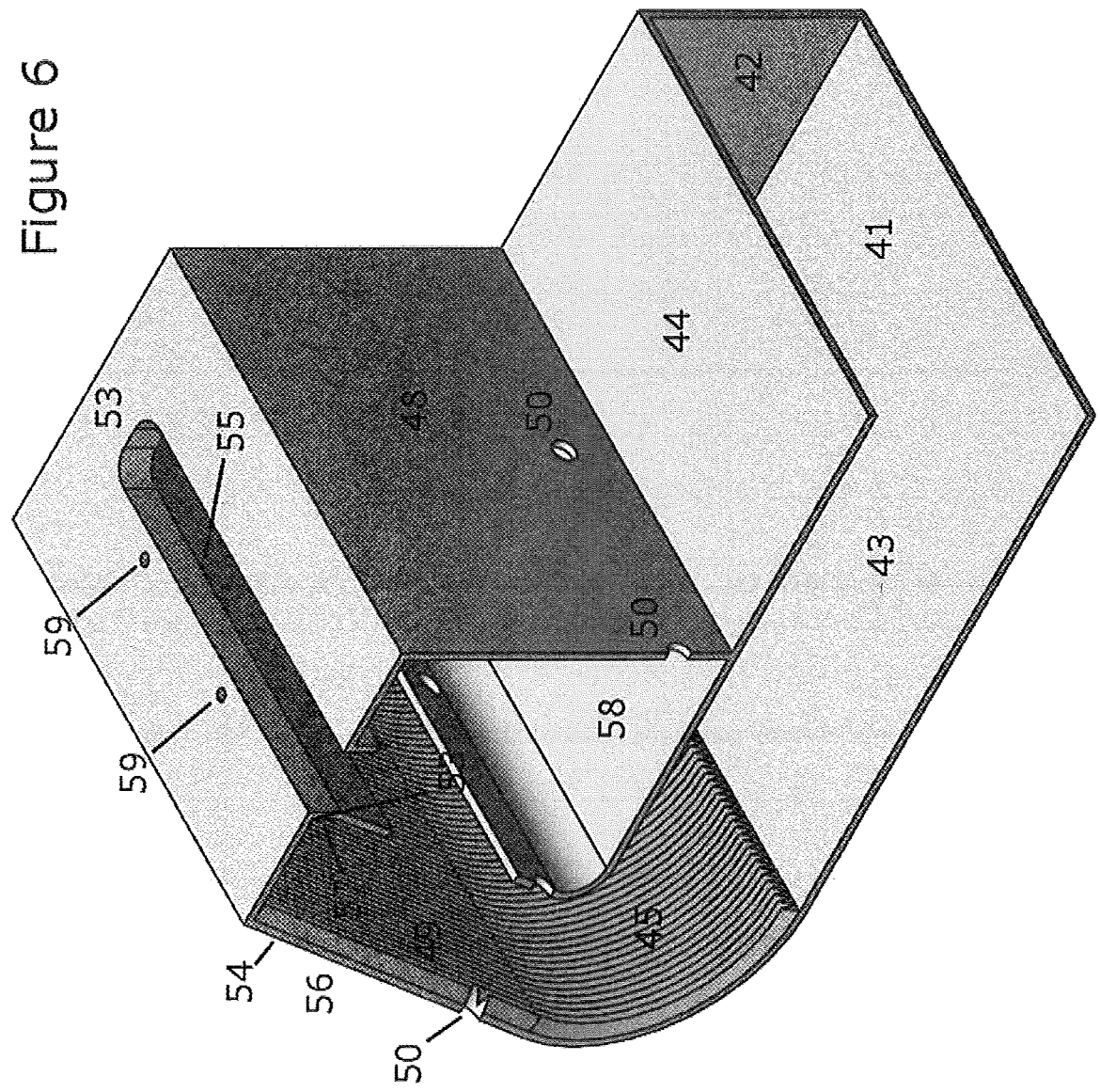
FIG. 6 is a cutaway isometric view of the burner of FIG. 5.

FIGS. 5 and 6 show an embodiment of the metallic burner having both a descending and ascending baffles. Without wishing to be bound by theory it is believed that the narrowing the flow passage increases flow velocity and, therefore, increase heat transfer to portions of the burner exposed to the cracking furnace.

In FIGS. 5 and 6, the burner comprises a lower flow channel 41 having an open back or upstream end. The flow channel is defined by a two equal length closed side walls 42 (only one is shown), a closed bottom wall 43 which extends beyond top wall 44 and a front wall 45. The top wall 44 does not extend as far as the side walls 42. As a result the lower flow channel defines an upward facing vent 46.

The burner also comprise an upper metal section or duct. The upper section comprises two side walls 47 (only one is shown), a back wall 48 and an extension of the front wall 49 which cooperates with vent 46 to provide a continuous passage way. There are one or more holes 50 in the back wall 48 and the front wall extension 49 at substantially the same height and lateral displacement from the side walls to permit the passage of one or more metal fuel supply lines not shown through the burner.

In the embodiment shown the front wall further extends up through a front section 54 which may optionally be rounded and through a flat back section 53 until it joins with the back wall 48. In the flat back section there are series of apertures (openings which may be may be circular, oval, or polygon (e.g. triangular, rectangular or square)) 55. Depending from the sides of the flat sections are a duct elements 52 which direct the flow of oxidant through the apertures 55. In the embodiment shown there are a number of holes 59 through the front section 54. However the holes are optional and need not be present.

Also, dependent from the leading edge of apertures 55 is structural element 51 which helps support hangar 56 for the baffle 57 and also stabilized duct element 54.

The hanger is positioned so that the descending baffle 57 is not more than 10% forward of the leading edge of the aperture 55. The operation of baffle 57 is as described relative to FIGS. 1 and 2.

In the embodiment shown in FIGS. 5 and 6 there is also baffle 58, which extends upward from top wall 44 of the flow channel 41. The baffle 58 curves up into the upper metal section (duct) of the burner from about 15 to 75, or from about 30 to 55% of the height of the upper metal section. In this embodiment, the baffle 58 may completely traverses the upper metal or duct section (e.g. from 100 to 75% of the width of the burner as described above). If the baffle 58 extends sufficiently high in the upper metal section (duct) of the burner there may be one or more holes in the baffle to permit one or more metal fuel supply line to pass through the baffle 58.

The tubular burners as described above may be mounted in the wall of the furnace and the burners as shown in the figures may be floor mounted. The refractory lining in the wall or floor, as the case may be, has an opening through which the burner fits and then a refractory and cement are used to close the opening through which the burner was fitted. The burner is also attached to the external supports (frame) for the furnace and the external ducts to supply oxidant, for example air, to the burner. Also the fuel supply lines are connected to the fuel supply, for example, natural gas.

In a similar manner, one can design a wall burner wherein the refractory tile surrounding the wall burner is replaced by a metal box or plate with a flow channel to direct oxidant along the internal surface of the metal portion whose external portion is exposed to the high temperatures of the furnace.

Figure 7:
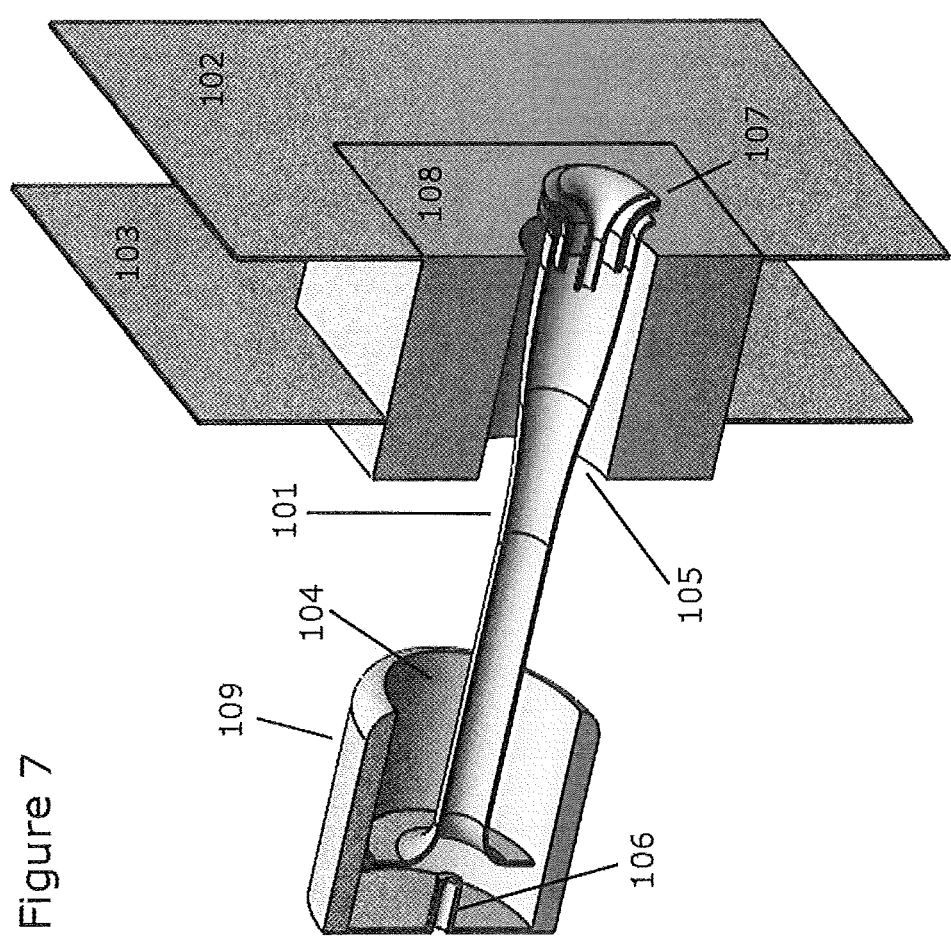
FIG. 7 is a cutaway isometric view of a wall burner typically used in pyrolysis furnaces.

FIG. 7 shows a sectioned view of a wall burner typical of a pyrolysis furnace. FIG. 7 is meant to show the concepts of a typical wall burner but does not show all details. The wall burner 101, is used to direct fuel and oxidant into the furnace for combustion. Fuel is injected into the wall burner through an inlet orifice 106 where it mixes with air from the primary air duct 104. The primary air duct is formed through an annular opening around the wall burner 101 and muffler 109. The muffler is used to reduce combustion noise. Premixed fuel flows through the burner and enters the furnace through a series of guide vanes 107. Secondary air enters the furnace through an opening between the wall burner 101 and refractory tile 108 (not shown is a door or means to control the amount of secondary air). The secondary air flow makes up the remainder of the oxidants required to fully combust the fuel. Combustion occurs in part on the refractory tile 108 surrounding the wall burner 107 and therefore is expected to have high surface temperatures. The wall burner 101 and refractor tile 108 are mounted between the furnace interior wall 102 and furnace exterior wall 103. The furnace walls, defined as the surfaces 102 and 103 and the space between them are constructed from a variety of metal and refractory materials.

Figure 8:
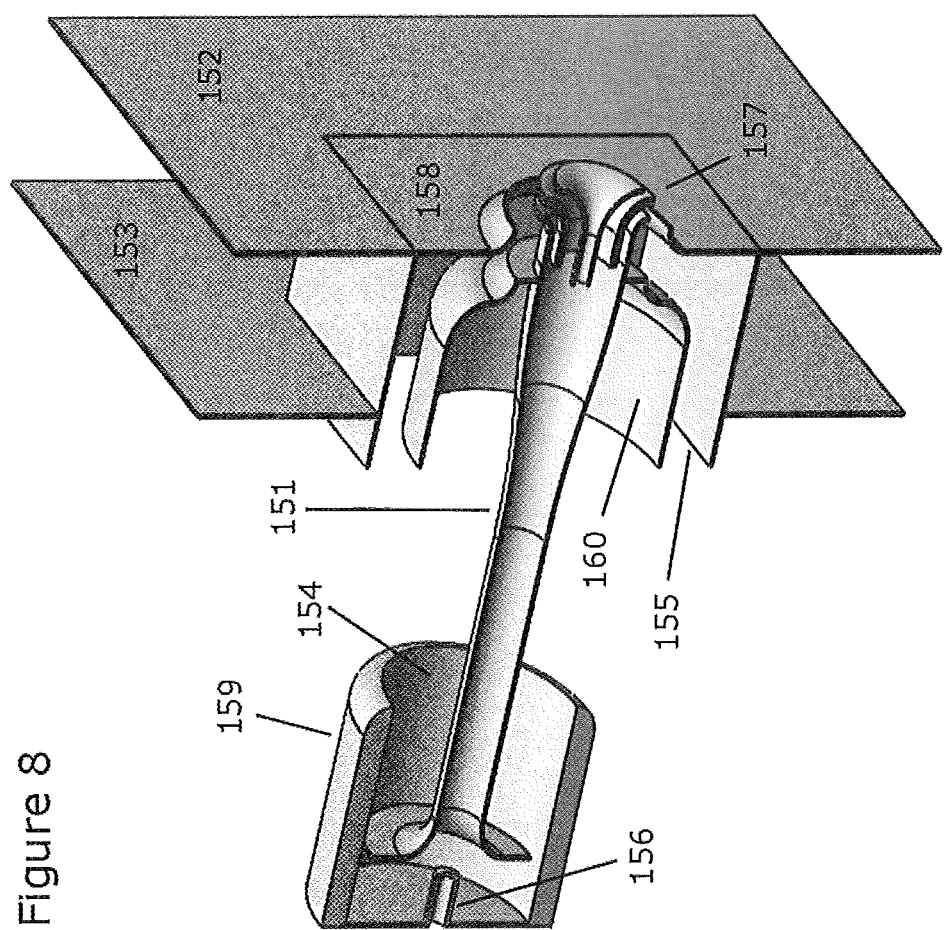
FIG. 8 is a cutaway isometric view of a wall burner typically used in pyrolysis furnaces but with design elements in accordance with the present disclosure.

FIG. 8 shows a sectioned view of a wall burner typical of a pyrolysis furnace with design elements in accordance with the ideas of the present disclosure. FIG. 8 is meant to show the concepts of a typical wall burner but does not show all details. This burner assembly has been modified to remove all refractory materials. The wall burner 151, is used to direct fuel and oxidant into the furnace for combustion. Fuel is injected into the wall burner through an inlet orifice 156 where it mixes with air from the primary air duct 154. The primary air duct is formed through an annular open around the wall burner 151 and muffler 159. The muffler is used to reduce combustion noise. Premixed fuel flows through the burner and enter the furnace through a series of guide vanes 157. Secondary air enters the furnace through an opening between the metal tile 158 and the secondary air guide 160 (not shown is a door or means to control the amount of secondary air). The guide 160 is used to direct secondary air flow over the surfaces of the metal tile exposed to the high temperature environment in the radiant section of the cracking furnace. The secondary air flow makes up the remainder of the oxidants required to fully combust the fuel. Combustion occurs in part on the metal tile 158 surrounding the wall burner 151 and therefore is expected to have high surface temperatures. The secondary air keeps the surface of the metal tile 158 below the distortional temperature. The wall burner 151 and metal tile 158 are mounted between the furnace interior wall 152 and furnace exterior wall 153. The furnace walls, defined as the surfaces 152 and 153 and the space between them are constructed from a variety of metal and refractory materials.

The metallic burners also comprise ancillary equipment such as pilot lights, and the fuel feed there for joining members for duct works and any mechanical oxidant flow controllers as well as instrumentation.

The refractory material may be any type of refractory materials that are commonly used in the construction of a furnace refractory wall. Examples of such refractory materials include dolomites, silicon carbide, aluminates (Al2O3), aluminum silicates, chromites, silica, alumina, zirconia (ZrO2), and mixtures thereof. In some embodiments, such refractory materials are selected from silica, alumina (Al2O3), aluminum silicates, zirconia, (ZrO2), and mixtures thereof. Such a refractory may optionally be non-porous in nature, even though the mentioned refractory materials are typically porous. In some embodiments, the refractory will be porous and have a porosity of not less than 0.1 cc/g. In some embodiments, the porosity may be from 0.1 to 0.5 cc/g, or from 0.1 to 0.3 cc/g.

Examples of refractory walls include Empire (trademark) S, which is a high duty dry press fireclay brick, Clipper (trademark), Korundal XD (trademark) and Insblok-19 available from A.P. Green Industries, Inc. (of Mexico, Mo.). An example of a ceramic fiber refractory includes Insboard 2300 LD also available from A.P. Green Industries, Inc. These refractory materials contains approximately 9.7% to 61.5% silica ($SiO_2$), 12.1% to 90.0% alumina ($Al_2O_3$), 0.2% to 1.7% iron oxide ($Fe_2O_3$), up to 27.7% lime (CaO), 0.1% to 0.4% magnesia (MgO), 2.0% to 6.3% titania ($TiO_2$) and 0.1% to 2.4% of alkalies ($Na_2O$ plus $K_2O$).

The refractory use to coat the top plates may have a similar compositions.

Cracking furnaces operate with walls at temperatures from about 700° C. to about 1350° C., or from about 850° C. to about 1200° C., or from 850° C. to 1100° C.

The metallic components used in the burner should be mechanically stable at such temperatures. The metal components may be made from any high temperature steel such as stainless steel selected from wrought stainless, austenitic stainless steel and HP, HT, HU, HW and HX stainless steel, heat resistant steel, and nickel based alloys. The coil pass may be a high strength low alloy steel (HSLA); high strength structural steel or ultra high strength steel. The classification and composition of such steels are known to those skilled in the art.

In one embodiment the stainless steel, for example heat resistant stainless steel, in some embodiments comprises from 13 to 50, or from 20 to 50, or from 20 to 38 weight % of chromium. The stainless steel may further comprise from 20 to 50, or from 25 to 50, or from 25 to 48, or from about 30 to 45 weight % of Ni. The balance of the stainless steel may be substantially iron.

Embodiments disclosed herein may also be used with nickel and/or cobalt based extreme austenic high temperature alloys (HTAs). In some embodiments the alloys comprise a major amount of nickel or cobalt. In some embodiments the high temperature nickel based alloys comprise from about 50 to 70, or from about 55 to 65 weight % of Ni; from about 20 to 10 weight % of Cr; from about 20 to 10 weight % of Co; and from about 5 to 9 weight % of Fe and the balance one or more of the trace elements noted below to bring the composition up to 100 weight %. In some embodiments the high temperature cobalt based alloys comprise from 40 to 65 weight % of Co; from 15 to 20 weight % of Cr; from 20 to 13 weight % of Ni; less than 4 weight % of Fe and the balance one or more trace elements as set out below and up to 20 weight % of W. The sum of the components adding up to 100 weight %.

In some embodiments the steel may further comprise a number of trace elements including at least 0.2 weight %, up to 3 weight %, or for example, 1.0 weight %, up to 2.5 weight %, or for example, not more than 2 weight % of manganese; from 0.3 to 2, or from 0.8 to 1.6, or for example less than 1.9 weight % of Si; less than 3, or for example less than 2 weight % of titanium, niobium (for example less than 2.0, or less than 1.5 weight % of niobium) and all other trace metals; and carbon in an amount of less than 2.0 weight %. The trace elements are present in amounts so that the composition of the steel totals 100 weight %.

Figure 9:
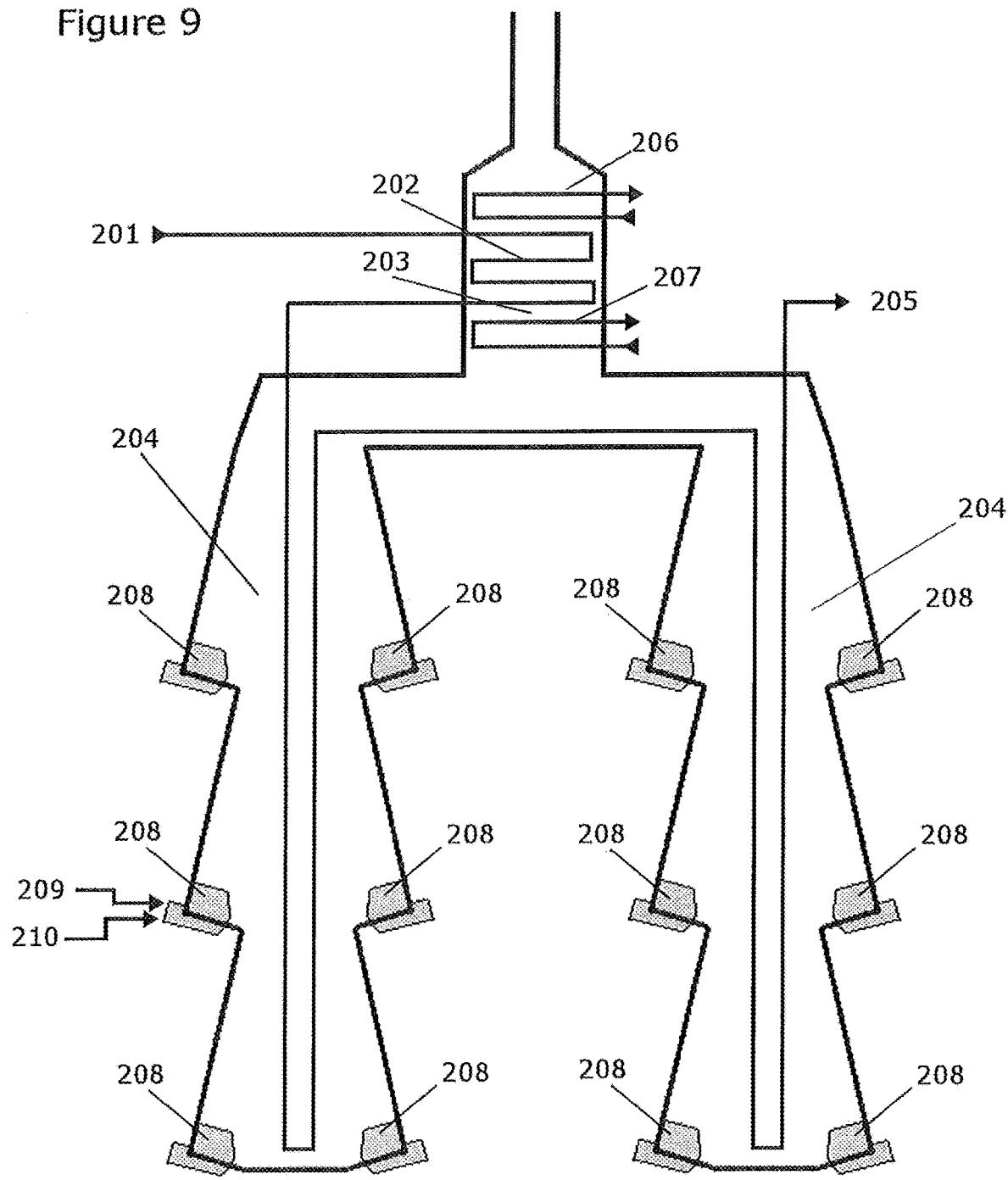
FIG. 9 is schematic drawing of an example ethylene furnace in which a burner designed in accordance with the present disclosure could be installed.
Figure 10:
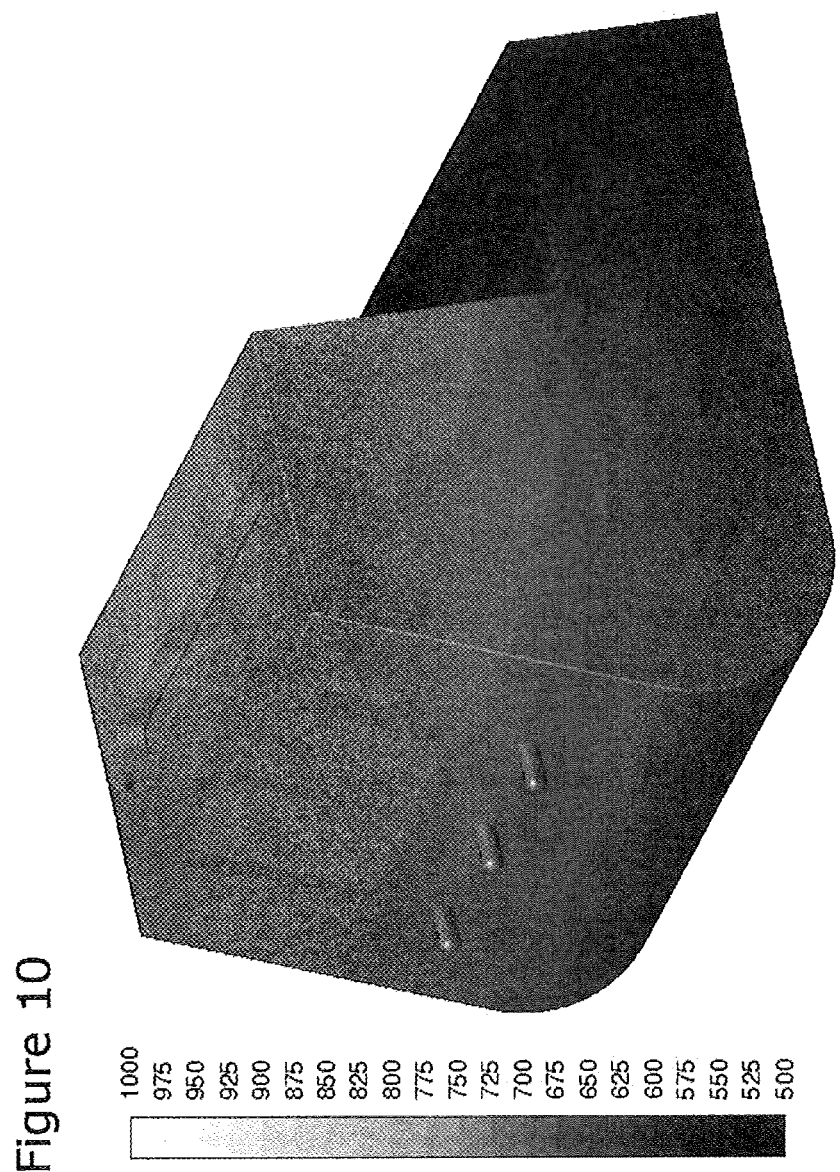
FIG. 10 is an isometric view of a floor burner designed in accordance with the present disclosure displaying shading representing the operating surface temperature of the burner constructed of metal.

One embodiment of the present disclosure is demonstrated in FIGS. 9 and 10. FIG. 9 shows a simple schematic of a Foster-Wheeler pyrolysis furnace that can be used for cracking ethane to ethylene. In a cracker such as the ethylene cracker shown in FIG. 9, the feed stock 201 (a mixture of ethane and steam) enters a coil 202 passing through the exhaust portion of the 203 typically referred to as the convection section of the furnace. The feed is pre-heated in the convection section to a controlled and specific temperature. In some embodiments, steam is also heated in the convection section in a separate coil 207. In some embodiments, boiler feed water is also heated in the convection section in a separate coil 206. The coil 202 with the feed stock 201 passes through the radiant section 204 of the furnace before it exits 205 at which point it may be rapidly quenched to a lower temperature. The coil 202 passes through the radiant section of the furnace 204 where it is exposed to the heat generated by the burners 208. The furnace shown in FIG. 9 displays a cracking furnace configuration with two radiant sections with the coil passing through both radiant sections. There are numerous other configurations including a furnace with a single radiant section.

Computational fluid dynamics (CFD) has been used previously to model the operation of the radiant section of a NOVA Chemicals ethane cracker. Some embodiments of operation of this section of this particular pyrolysis furnace have pre-heated combustion air at 215° C. air and fuel composed of a mixture of 60% molar fraction hydrogen and 40% molar fraction natural gas at a pre-heated temperature of 130° C. The burners within the furnace are commercially available low-NOX burners constructed of refractory typically used in high temperature furnaces. The single burner heat release rate is approximately 5 MMBtu/hr (1.5 MW) with the flue gas wet oxygen molar concentration at 2%. Real plant data and CFD model results have been compared, including but not limited to the surface temperature of the process coils, surface temperature of the refractory burners, flue gas exit temperature and process coil heat transfer rates. A comparison of the modeled vs. plant operating measurements was found to be sufficiently close (within 10%) such that it could be used for the prediction of plant performance in a practical manner.

This validation work was used to define model requirements and settings to predict the performance of a burner designed using metal as a material of construction instead of refractory material in accordance with the present disclosure. FIG. 9 shows a profile view of a Foster-Wheeler style pyrolysis furnace with the radiant section 204 and the locations of burners 208. FIG. 10 shows the surface temperature as predicted by NOVA Chemicals CFD of a burner (such as shown in FIG. 5) designed in accordance with this disclosure and operating at conditions as described in the paragraph above. The temperature scale has a range selected to show temperatures between 500° C. and 1000° C. Temperatures below or above this range are shown at the extremes of the scale. FIG. 10 shows that, for this example burner, the surface temperature is no higher than 900° C., which is below the distortion temperature of metals that would be used for burner construction. This shows that there is a balance of heat transfer between the firing rate of the burner and the internal cooling rate induced by the combustion air and the design of the metal burner.

What is claimed is:

1. A substantially metallic burner configured to operate at a service temperature of not less than about 1200° C. for a cracking furnace operating with walls at temperatures from 700° C. to 1350° C., the burner comprising:
   a substantially metallic flow passage comprising a downstream outlet and at least one upstream inlet for at least a gaseous oxidant, the flow passage comprising a wall having an internal surface and an external surface, the external surface facing the cracking furnace;
   at least one baffle directing the flow of the oxidant or the oxidant and fuel against the internal surface of the wall;
   one or more arrays of heat convective surfaces that are ribs that define at least one continuous series of parallel channels at least on the internal surface of the portions of the burner exposed to the cracking furnace, wherein the channels have a height to width ratio from 0.1 to 2; and
   a metallic fuel line that terminates proximate the external front surface for said flow passage from 25 to 75% of the height of the front of the flow passage, wherein said flow passage has a thickness from 4 to 25 mm; wherein:
   said substantially metallic flow passage comprises a lower metal flow section comprising an open back end, closed lower side walls and a closed bottom wall, a top wall which does not extend the full length of the lower side walls to define an open upward facing vent in the upper front end of the flow passage, and a lower metal front wall continuous with the bottom wall;
   said substantially metallic flow passage comprises an upper metal flow section comprising a a chamber defined by an upper front wall connected to the lower front wall of the lower metal flow section, upper side walls, a back wall, an open top, and an open bottom which co-operates with the open upward facing vent of the lower metal flow section, wherein said upper front wall and back wall having openings therein at substantially the same height and lateral displacement to provide for one or more fuel supply lines passing from the back to the front of said upper metal flow section, wherein the upper front wall is said wall whose external surface faces the cracking furnace;
   the burner comprises either:
   a) one or more metal, or ceramic coated metal, top plates cooperating with the open top of the upper metal flow section, said one or more top plates having a planar surface and having a curved leading edge and one or more circular passageways there through, and a back section having one or more polygon outlets for said one or more gaseous oxidant there through; or
   a continuation of the upper front wall extending to the back wall of the upper metal flow section, said continuation having a leading edge curved and having one or more circular passageways there through, and a planar back section having one or more polygon outlets for the oxidant there through, said back section being coated with a ceramic; and
   the at least one baffle extends into said upper metal flow section.

2. The burner according to claim 1, wherein the at least one baffle extending into said upper metal flow section comprises a descending baffle descending from a region not more than 10% forward of the forward lip of said one or more outlets for said one or more gaseous oxidants, said descending baffle descending inside the upper metal flow section of the burner from 50 to 90% of the height of the front face of said burner; and extending laterally across the inner surface of the burner from 100 to 75% of the weight of the face of said burner, said descending baffle being positioned so that there are equal openings on each side of the descending baffle relative to the side walls of the upper metal flow section and said descending baffle having one or more circular channels there through to permit one or more fuel supply lines to pass there through.

3. The burner according to claim 2, having series of parallel longitudinal internal ribs to direct the flow of said at least a gaseous oxidant over the forward facing surface of said descending baffle.

4. The burner according to claim 3, wherein the at least one baffle extending into said upper metal flow section comprises an ascending baffle extending forward from the top wall of said lower metal flow section into from 45 to 85% of the open area in the chamber of said upper metal flow section.

5. The burner according to claim 4, wherein said ascending baffle extending forward from the top wall of said lower metal flow section is bent in its forward section up towards said one or more outlets to provide an upwards facing ascending baffle parallel to the upper front wall of said upper metal flow section and the upward extending section of said ascending baffle having one or more circular channels there through to permit one or more fuel supply lines to pass there through.

6. The burner according to claim 5, wherein said ascending baffle extending forward from the top wall of said lower metal flow section further comprises, on the surface facing the upper front wall of said upper metal flow section, a series of parallel longitudinal internal ribs to direct the flow of said at least a gaseous oxidant over the internal surface of said substantially metallic flow passage.

7. The burner according to claim 6, wherein the channels have a height to width ratio from 0.1 to 2.

8. The burner according to claim 2, wherein said one or more top plates is present and is metal.

9. The burner according to claim 2, wherein said one or more top plates is present and is metal coated with ceramic.

10. The burner according to claim 4, wherein said one or more top plates is present and is metal.

11. The burner according to claim 9, wherein said one or more top plates is present and is metal coated with ceramic.

12. The burner according to claim 2, wherein the upper front wall continues to the back wall and the back section is not coated with ceramic.

13. The burner according to claim 2, wherein the upper front wall continues to the back wall and is coated with ceramic.

14. The burner according to claim 4, wherein the upper front wall continues to the back wall and the back section is not coated with ceramic.

15. The burner according to claim 4, wherein the upper front wall continues to the back wall and is coated with ceramic.

* * * * *